United States Patent [19]

Paoli

[11] Patent Number: 5,497,181
[45] Date of Patent: Mar. 5, 1996

[54] DYNAMIC CONTROL OF INDIVIDUAL SPOT EXPOSURE IN AN OPTICAL OUTPUT DEVICE

[75] Inventor: Thomas L. Paoli, Los Altos, Calif.

[73] Assignee: Xerox Corporation, Stamford, Conn.

[21] Appl. No.: 906,145

[22] Filed: Jun. 29, 1992

[51] Int. Cl.$^6$ .................................................. G01D 15/14
[52] U.S. Cl. ................................................................ 347/133
[58] Field of Search .................................. 346/108, 160, 346/76 L; 347/133, 246, 236

[56] References Cited

U.S. PATENT DOCUMENTS

| | | | |
|---|---|---|---|
| 4,017,180 | 4/1977 | Yen et al. | 355/68 |
| 4,445,125 | 4/1984 | Scifres et al. | 346/108 |
| 4,639,275 | 1/1987 | Holonyak, Jr. | 148/1.5 |
| 4,674,100 | 6/1987 | Kobayashi | 372/96 |
| 4,802,182 | 1/1989 | Thornton et al. | 372/50 |
| 4,862,299 | 8/1989 | Shimada | 358/299 |
| 4,870,652 | 9/1989 | Thornton | 372/50 |
| 4,916,706 | 4/1990 | Ohashi | 372/31 |
| 4,980,893 | 12/1990 | Thornton et al. | 372/50 |
| 4,987,468 | 1/1991 | Thornton | 357/34 |
| 5,107,275 | 4/1992 | Tsuruoka et al. | 346/1.1 |
| 5,136,604 | 8/1992 | Paoli et al. | |
| 5,172,117 | 12/1992 | Mills et al. | 341/157 |
| 5,270,736 | 12/1993 | Inoue et al. | 346/108 |

FOREIGN PATENT DOCUMENTS

| | | |
|---|---|---|
| 0258060 | 3/1988 | European Pat. Off. . |
| 0430691A3 | 6/1991 | European Pat. Off. . |
| 3516375 | 11/1985 | Germany . |
| 56-0199678 | 12/1981 | Japan . |
| 58-108711 | 6/1983 | Japan . |
| 60-0154581 | 7/1985 | Japan . |
| 60-0224950 | 10/1985 | Japan . |
| 61-263172 | 11/1986 | Japan . |

OTHER PUBLICATIONS

Wada, O.; Furuya, A.; Makiuchi, M. Planar, Compitible OEIC's Based on Multiquantum Well Structures. IEEE Photonics Technology Letters, vol. 1, No. 1, Jan. 1989, New York, U.S.A., pp. 16–18.

Thomas, D. C. Scanning Beam Detector. Xerox Disclosure Journal. vol. 6, No. 5, Sep./Oct. 1981. pp. 227–228.

Thornton, R. L.; Mosby, W. J.; Chung, H. F. *Unified Planar Process for Fabricating Heterojunction Bipolar Transistors and Buried–Heterostructure Lasers Utilizing Impurity–Induced Disordering.* Applied Physics Letters, vol. 53, No. 26, pp. 2669–2671, 26, Dec. 1988.

Campbell, J. C. *Phototransitiors for Lightwave Communications.* Semiconductors and Semimetals, vol. 22, part D, edited by W. T. Tsang, pp. 389–447, Academic Press, (1985).

Merz, J. L.; Logan, R. A. *Integrated GaAs–$Al_xGa_{1-x}As$ Injection Lasers and Detectors with Etched Reflectors.* Applied Physics Letters, vol. 30, No. 10, pp. 530–533, 15, May 1977.

Iga, K.; Miller, B. I. *GaInAsP/InP Laser with Monolithically Integrated Monitoring Detector.* Electronics Letter, vol. 16, pp. 342–343, 27 Mar. 1980.

(List continued on next page.)

*Primary Examiner*—Peter S. Wong
*Assistant Examiner*—Randy W. Gibson

[57] ABSTRACT

The optical energy per pulse emitted by a laser source is accurately controlled from pulse to pulse by controlling the duration of the pulse according to the integrated value of its amplitude over time. A control signal is formed by converting a portion of the optical output of the laser to an electrical signal with a photodetecting element whose electrical output signal is integrated over time. The laser excitation is terminated when the integrated photocurrent reaches a set threshold level representing the optical energy desired for the pulse. Accurate control of the optical energy in each pulse is maintained in spite of error producing conditions such as unpredictable fluctuations in the laser drive signal, ambient temperature fluctuations, transient heating, and cumulative effects due to sequences of pulses.

10 Claims, 7 Drawing Sheets

OTHER PUBLICATIONS

Katz, J.; Bar–Chaim, N.; Chen, P. C.; Margalit, S.; Ury, I.; Wilt D.; Yust, M.; Yariv, A. A. *Monolithic Integration of GaAs/GaAlAs Bipolar Transistor and Heterostructure Laser,* Applied Physics Letters, vol. 37, No. 2, pp. 211–213, 15 Jul. 1980.

Bona, G. L.; Buchmann, P.; Clauberg, R.; Jaeckel, H.; Vettiger, P.; Voegeli, I.; Webb D. J. *Beam Properties of AlGaAs Power Lasers with High–Quality Etched Mirrors.* IEEE Photonics Technology Letters, vol. 3, No. 5, pp. 412–413, May 1991.

DYNAMIC CONTROL OF INDIVIDUAL SPOT EXPOSURE IN AN OPTICAL OUTPUT DEVICE

BACKGROUND OF THE INVENTION

The present invention relates generally to the field of optical output devices, and more specifically to a method and apparatus for accurately controlling the optical energy delivered to a photoreceptive element in a raster output scanning system.

Although applicable to a wide variety of optical output devices, the present invention finds particular utility in Raster Output Scanning (ROS) apparatus. Therefore, the following details and descriptions begin with a background of the present invention in terms of ROS apparatus. ROS has become the predominant method for imparting modulated light information onto the photoreceptor in printing apparatus used, for example, in digital printing, and has found some application in other image forming operations such as writing to a display, to photographic film, etc. Consider, for illustration purposes, what is perhaps the most common application of ROS, digital printing. As is known, the scanning aspect thereof is conventionally carried out by a moving reflective surface, which is typically a multifaceted polygon with one or more facets being mirrors. The polygon is rotated about an axis while an intensity-modulated light beam, typically laser light, is brought to bear on the rotating polygon at a predetermined angle. The light beam is reflected by a facet and thereafter focussed to a "spot" on a photosensitive recording medium. The rotation of the polygon causes the spot to scan linearly across the photosensitive medium in a fast scan (i.e., line scan) direction. Meanwhile, the photosensitive medium is advanced relatively more slowly than the rate of the fast scan in a slow scan direction which is orthogonal to the fast scan direction. In this way, the beam scans the recording medium in a raster scanning pattern. (Although, for the purposes of example, this discussion is in terms of ROS apparatus, as will become apparent from the following discussion, there exists many other scanning and non-scanning system embodiments of the present invention. However, as a convention, the word "scan" when referring to fast and slow scan directions will be used with the understanding that actual scanning of the spot is not absolutely required.) The light beam is intensity-modulated in accordance with a serial data stream at a rate such that individual picture elements ("pixels") of the image represented by the data stream are exposed on the photosensitive medium to form a latent image, which is then transferred to an appropriate image receiving medium such as sheet paper.

Images to be transferred to the photoreceptor are generally in the form of sampled data in each of the fast and slow scan directions. The sampled data represents the discrete elements, or pixels, comprising the image. Each pixel of the image is reproduced by one or more spots, each of which is formed by exposure of the photoreceptor with one or more pulses of optical energy. Each pulse of optical energy is formed by modulating the intensity of the scanned light beam. For the purposes of example, the word "pulse" when referring to formation of a single spot will be used with the understanding that the "pulse" may be composed of multiple subpulses, whose total energy content is used to form an individual spot.

The size and shape of each exposed spot depends on the optical energy contained in the pulse as well as on the size and shape of the imaged spot. This dependence on energy delivered per pixel results from the existence of a threshold amount of energy that must be delivered to the photosensitive surface before a spot is exposed. The amount of energy delivered to the photosensitive surface is equal to the time-integrated output of the optical pulse. Thus the size of each spot depends on the duration of the optical pulse as well as on its amplitude. In systems currently known to those skilled in the art, a predetermined amount of energy is delivered to the photosensitive surface by turning on the optical beam to a desired amplitude for a fixed time interval. Since the amount of energy delivered to the photosensitive surface controls, inter alia, the spot size, spot profile, etc., variations in the size of the exposed spot may be obtained by varying the amplitude of the optical beam while maintaining a constant pulsewidth or by varying the pulsewidth while maintaining a constant amplitude.

In order to expose reproducible spots on the photoreceptor, the optical energy delivered in each pulse must be accurately controlled. Accurate control is especially important when printing with different gray levels formed by varying the number of exposed spots within a half tone cell or when exposing very closely spaced spots in order to control the formation of an edge. It has been shown that variations in the optical energy as small as 1% of the total energy used to form the spot may be perceived in a half tone or continuous tone image. This implies a need for a high degree of accuracy and reproducibility in the optical energy delivered to each spot, especially in such applications as color and gray-scale printers.

Variations in the optical energy per spot can arise from fluctuations in either the amplitude or pulsewidth of the optical power emitted by the laser source. Amplitude fluctuations in the laser power can arise from many sources, including for example ambient thermal fluctuations, fluctuations in the drive current, and/or the preceding pattern of modulation. Fluctuations in pulsewidth can arise from many sources, including for example the driving electronics, trigger signals, the turn-on or turn-off times of the laser, and/or the preceding pattern of modulation.

Thermal fluctuations are especially deleterious to maintaining constant optical energy per pulse. For example, heating of the laser chip unavoidably occurs when the applied laser current is abruptly increased at the beginning of a pulse. Since a laser's output power generally decreases as temperature increases, this time-dependent, or transient, heating normally causes the power output to decrease or "droop" during the pulse. Furthermore, transient heating during a sequence of pulses can have a cumulative effect on the temperature that depends on the number and frequency of the pulses. For example, if the time between successive pulses is large, the device will be given sufficient time to cool, so that the application of the driving current has a large temperature effect, i.e. droop, during the next pulse. The shorter the time between pulses, the less time the device has to cool between one pulse and the next, leading to a sustained increase in the temperature of the laser. This sustained temperature increase results in a further decrease in amplitude of the output pulse obtained with a fixed amplitude of the input current, leading to a further variation in the energy of each optical pulse.

Additional deleterious effects on the optical energy per pulse occur in a multiple beam ROS employing a monolithic optical source containing more than one diode laser, for example as described in U.S. Pat. No. 4,445,125, which is incorporated herein by reference thereto. In such monolithic sources composed of closely spaced diode lasers, the modulation of one laser induces a variation of power emitted by other lasers, either through electrical, optical, or thermal coupling. The coupling between neighboring lasers on the same chip interacts with the self-heating of each laser produced by its modulated current to produce erratic and unpredictable fluctuations in the output power of each laser. Similar effects may also occur with nonmonoltihic lasers mounted in close proximity such that heat generated in one laser can be coupled into other lasers.

Since the above fluctuations in the power output of single and multiple laser sources occur within each pulse and are very difficult to predict, control, or eliminate, they are commonly not compensated for. However, such fluctuations are undesirable in a raster scanning optical system since they produce variations in the optical energy per spot that become undesirable artifacts on the printed page. Accordingly, there is presently a need in the art for apparatus and methods which provide accurate and reproducible control of the optical energy delivered to each spot of a raster scanning system. These and other problems are addressed by various aspects of the present invention, which will be summarized and then described in detail below.

SUMMARY OF THE INVENTION

The present invention provides a novel method for accurately controlling the optical energy used to form individual spots on an image plane in a scanning optical output system. A spot is the smallest individual exposure of the photoreceptive surface used to form the desired image. Each spot is formed with a pulse of optical energy obtained by modulating the optical output of a light-emitting source, usually a laser. In general, control of the energy in each pulse is provided by controlling the duration of the pulse according to the integrated value of its amplitude over time. Thus, the duration of the pulse may be employed to control the size of the spot formed on the photoreceptor. According to the present invention, a representation of that integral value is obtained by converting a portion of the optical output of the source to an electrical signal using a photodetecting element whose electrical output ("photocurrent") is integrated over time. The photocurrent is a known or measured function of the instantaneous optical power emitted by the laser so that the integrated value over any time interval is a direct measure of the optical energy emitted during that interval. Thus, when the integrated photocurrent reaches a set threshold level representing the optical energy desired for this spot, the optical pulse is terminated. The threshold level may be held fixed so that spots of constant size are formed or may be changed from spot to spot so that the spot size on the photoreceptive surface varies in a desired way (for example facilitating variable output resolution between 300 spi and 600 spi). In either case, the energy delivered for each spot is accurately controlled from spot to spot in spite of uncontrolled and unpredictable variations in the optical intensity emitted by the source.

The following description is also equally applicable to formation of an individual spot with multiple subpulses wherein either the energy content of each subpulse is accurately controlled according to this invention or the energy content of the entire set of subpulses is accurately controlled according to this invention. For clarity and simplicity, the following description shall be with regard to a single pulse embodiment.

The present invention may be embodied in a ROS apparatus which includes, inter alia, a light-emitting source, typically a solid state laser, means for pulse modulating the light beam in accordance with a data signal, means for terminating the optical pulse in accordance with a control signal derived (directly or indirectly) from the integral over time of the amplitude of the optical pulse, means for scanning the light beam in a raster fashion, and image plane means, such as a photoreceptive element, for receiving the scanned light beam.

In operation, a light beam is generated by the light source which is modulated in response to an image data signal. The light beam is scanned across at least a portion of a surface of the image plane means in the fast and slow scan directions. During the scanning, the image data signal modulates the light beam on and off to form distinct or overlapping spots of exposure on the surface of the image plane. The energy used to form each spot is accurately controlled by terminating the optical pulse in response to a control signal. The control signal is formed by sampling a constant fraction of the optical output emitted by the light source, converting the optical output to an electrical representation signal thereof, integrating the electrical representation signal over time, and comparing the integrated electrical representation signal to a set threshold value. When the integrated signal is equal to the threshold value, the optical pulse is terminated. The threshold level may be held fixed so that spots of constant size are formed on the surface of the image plane or may be changed from spot to spot so that spot size on the surface of the image plane varies in a desired way.

The control of optical energy provided by the present invention makes the areal size and/or illumination level of the exposure on the image plane independent of unknown and unpredictable variations in the amplitude or turn-on or turn-off times of the optical intensity emitted by the optical source. Such independence is especially important in multiple beam ROS apparatus employing a monolithic optical source composed of closely spaced emitters, where the modulation of one emitter induces an unpredictable variation of power output by the other emitter. Furthermore, it relieves the necessity of accurately measuring and adjusting for changes in laser threshold and efficiency which occur during long term operation.

The scope of the present invention and the manner in which it addresses the problems associated with prior art methods and apparatus will become more readily apparent from the following detailed description when taken in conjunction with the accompanying drawings and claims.

BRIEF DESCRIPTION OF THE DRAWINGS

In general, like reference numerals will be used to denote like elements as between each of the aforementioned figures.

DETAILED DESCRIPTION

Figure 1:
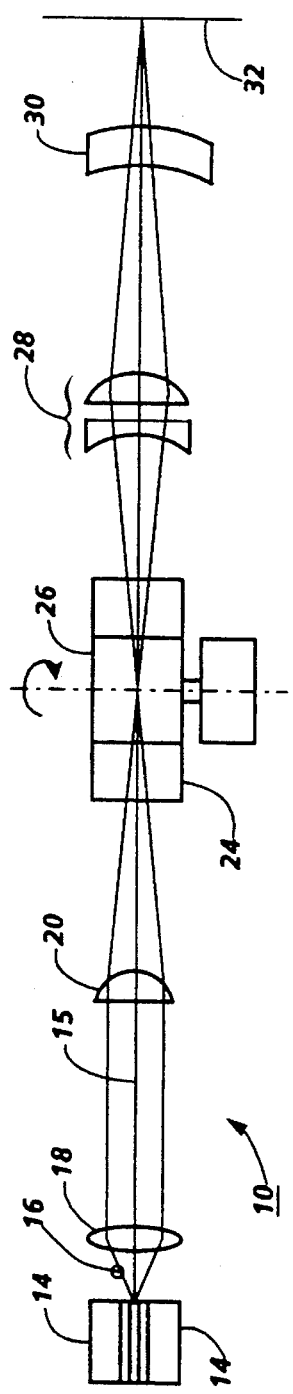
FIG. 1 shows a side or elevation view of the general optical configuration of an apparatus according to one embodiment of the present invention, showing a single diode laser as the light source for a typical ROS system.
Figure 1A:
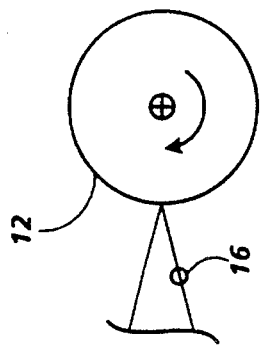
FIG. 1A shows a photoreceptive drum at the image plane of the apparatus of FIG. 1 as might typically be employed in a xerographic printing application of the present invention.
Figure 2:
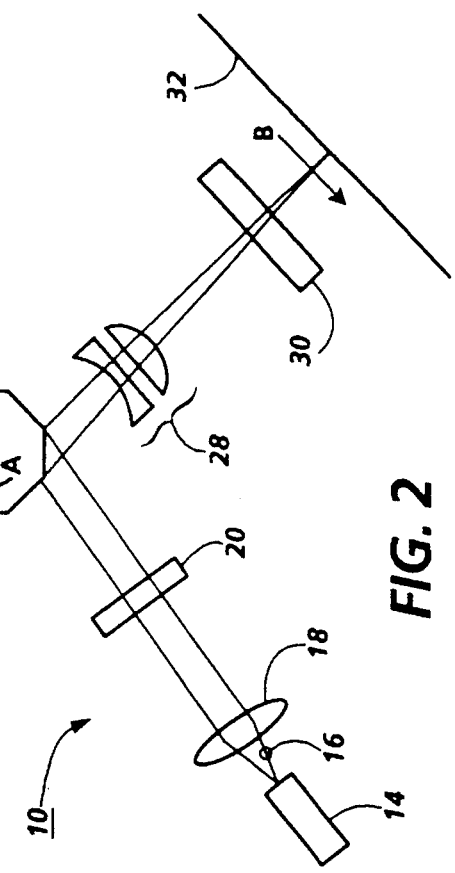
FIG. 2 shows a top or plan view of the general optical configuration of the apparatus of FIG. 1, showing a single diode laser as the light source for a typical ROS system.

A detailed description of a first embodiment of the present invention is presented herein with reference to FIGS. 1 and 2, which show, respectively, slow scan plane and fast scan plane views of a scanning apparatus 10. Apparatus 10 is a raster output scanning device of the type which may, for example, output a scanned modulated optical signal to a photoreceptive drum 12, such as that shown in FIG. 1A, for use in a xerographic printing process. Alternatively, apparatus 10 may output a scanned modulated optical signal to a display device, a photographic device or other application employing such a scanned modulated optical signal.

Apparatus 10 includes a light source 14, such as a solid state laser or array of lasers, which produces a diverging beam of coherent light 16. In the path of beam 16 are first spherical lens 18, a cylindrical lens 20, which has power only in the slow scan plane, scanning device 24, which is shown as a rotating polygon having at least one reflective facet 26 (but which may also be a rotating hologram, rotating diffraction grating, etc.), second spherical lens 28, and toroidal lens 30. The path of beam 16 terminates at image plane 32, which may be a line on the aforementioned rotating photoreceptive drum 12 (FIG. 1A), a surface of a ground glass or other type of display screen, a photosensitive film, etc.

Spherical lens 18 serves to collimate the diverging beam 16. Cylindrical lens 20 serves to focus beam 16 in the slow scan plane onto facet 26 of scanning device 24. Since beam 16 is not focussed onto facet 26 in the fast scan plane, it is appears on facet 26 as a line which extends across at least a portion of the width of facet 26.

Beam 16 is reflected by facet 26 so as to pass through compound spherical lens 28. Since the beam converges on facet 26, upon reflection it diverges. Therefore, lenses 28 and 30 are employed to refocus the beam to a circular or elliptical cross-section onto image plane 32, and to correct for scan nonlinearity (f-theta correction). Toroidal lens 30, or an equivalent thereto (such as a cylindrical mirror) further corrects for wobble (scanner motion or facet errors) as known in the art.

Thus, if scanning device 24 rotates in a clockwise fashion, as shown by arrow A in FIG. 2, a beam reflected from one of its moving facets will be caused to scan across the image plane 32, as indicated by the arrow B. By modulating the beam, for example by modulating the current applied to the laser itself from below to above the lasing threshold, as known in the art, a scanned modulated single beam of general application results. If the image plane 32 comprises the line on the rotating photoreceptive drum 12 of FIG. 1A, and the rotation of drum 12 and the modulation and scanning of the beam are properly coordinated, a ROS printer device may be realized.

Figure 3:
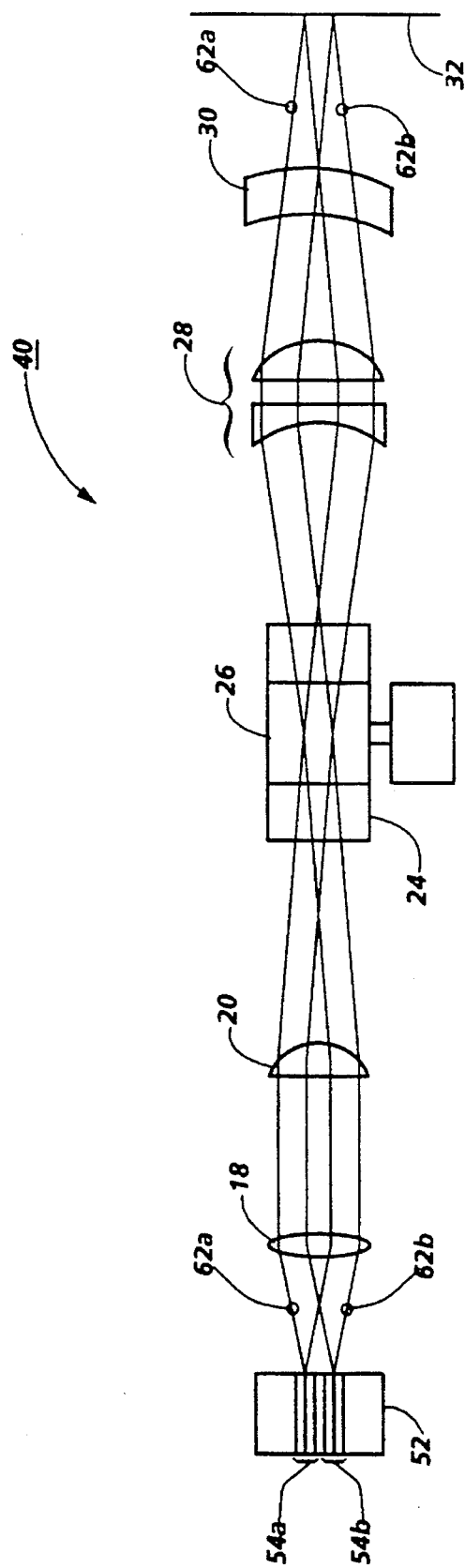
FIG. 3 shows a side or elevation view of the general optical configuration of an apparatus according to another embodiment of the present invention, showing a linear array of diode lasers as the light source for a typical ROS system and positions of two of the emitted laser spots imaged on the photoreceptive surface during a single scan.

FIG. 3 shows an embodiment of the present invention allowing simultaneous modulated scanning for a plurality of spots. In FIG. 3, apparatus 40 includes multiple light sources 54a, 54b, such as independent solid state lasers, or the emitters of a monolithic multiple beam solid state laser, which produce independent beams of coherent light 62a, 62b. As viewed in the slow scan plane of FIG. 3, beams 62a and 62b pass through spherical lens 18 which collimates the beams in the fast and slow scan planes. The collimated beams then pass through a cylindrical lens 20, so that they illuminate a facet 26 of scanning device 24. Cylindrical lens 20, which has power only in the slow scan direction, focuses the beams 62a and 62b onto facet 26, each beam being focused on the facet only in the slow scan direction so that each beam focuses on facet 26 as a line. Facet 26 reflects each of the beams, which at this point diverge, to lens 28. Lenses 28 and 30 refocus the beams onto image plane 32 and correct scan nonlinearity. Lens 30 is a toroidal wobble correcting element. As before, the image plane may be ground glass, a viewing screen, a photosensitive material (film, electrostatic photoreceptor, etc.), or other image plane viewing or receiving medium. Modulation of the beams may be conveniently achieved by directly modulating the output of each light source, for example by modulating the current applied to the laser itself from below to above the lasing threshold, as known in the art.

Due to the similarity between the structure and operation of the embodiments shown in FIGS. 1 through 3, the following description of these embodiments shall be with regard to a single beam embodiment (that shown in FIGS. 1 and 2) for clarity and simplicity. The following description is, however, equally applicable to multiple beam apparatus, as will be appreciated by those skilled in the art. Other suitable optical systems are also well known to those skilled in the art. Furthermore, many of the details of the lenses and other optical and mechanical components of a complete ROS system may be omitted for clarity since they are well known in the art.

Figure 4:
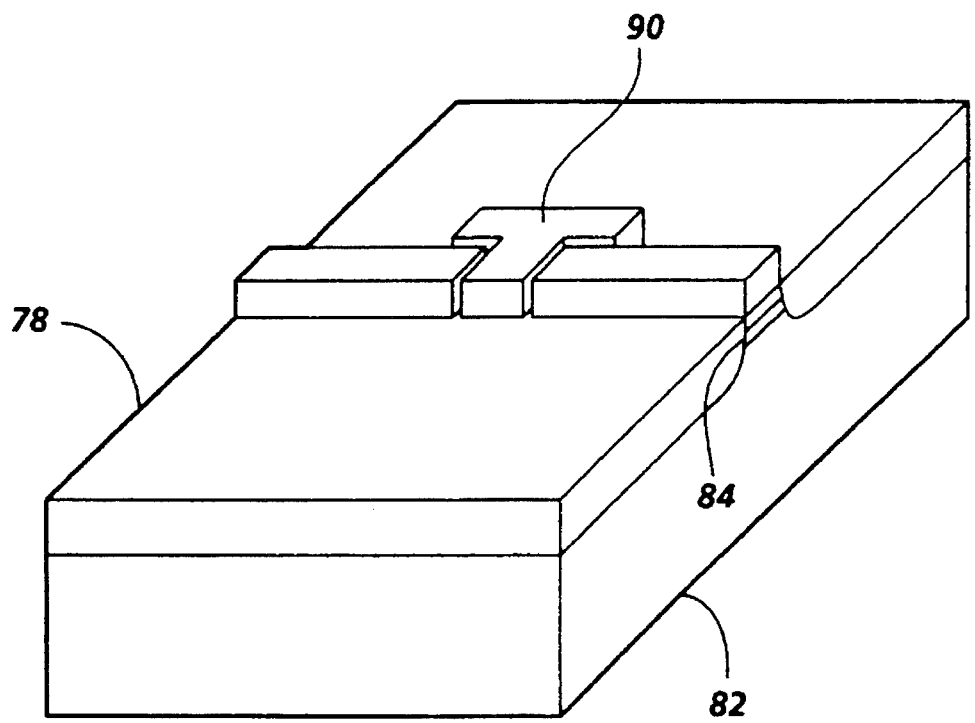
FIG. 4 shows one embodiment of a single diode laser integrated with an optical detector for monitoring the time varying power output of the laser.
Figure 5:
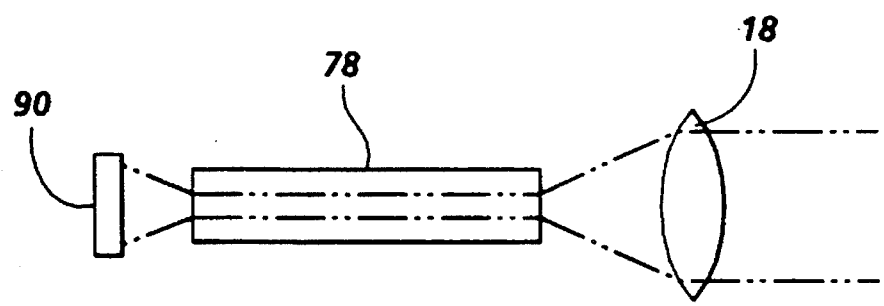
FIG. 5 shows a side or elevation view of one embodiment of a single diode laser with a separate optical detector for monitoring the time varying power output of the laser.

According to the present invention, the light source 14 in FIGS. 1 and 2 will typically be a diode laser of the buried heterostructure type or of other structural types known to those skilled in the art. One embodiment of the light source 14 is the buried heterostructure laser apparatus 78, shown in FIG. 4. Laser apparatus 78 is comprised of a substrate 82 upon which is epitaxially deposited a plurality of semiconductor layers generally designated by reference numeral 84 which provide for diode laser action. An individual diode laser is formed in the epitaxial layers, e.g. by the process of impurity induced disordering as described in U.S. Pat. No. 4,870,652 or by other techniques known to those skilled in the art. Each diode laser has an associated detector 90 either formed monolithically on the laser chip, e.g. as shown in FIG. 4, or packaged separately from the laser, as shown in FIG. 5. When formed monolithically, the detector can be any one of a number of different types as described in U.S. patent application Ser. Nos. 07/500,814 and 07/714,287, which are incorporated by reference herein, or other types known to those skilled in the art. The detector directly samples either the light power internal to the laser cavity, in the case of a monolithic detector, or the light power emitted by the laser, in the case of a nonmonolithic detector, to allow obtaining an output signal which is a known representation of, or proportional to, the time-dependent optical output of the laser.

Current is applied to the laser during each scan line of the output scanner. The current drive signal is a pulse modulation representation of the data to be printed and drives the laser to provide an output light beam modulated in accordance with this data. The output signal of the photodetector, of either monolithic or nonmonolithic type, is an electrical signal which is most commonly but not necessarily proportional to the variation of the amplitude of the output light beam during each pulse. This output signal is employed to further control the modulation of the light source as described below.

Figure 6:
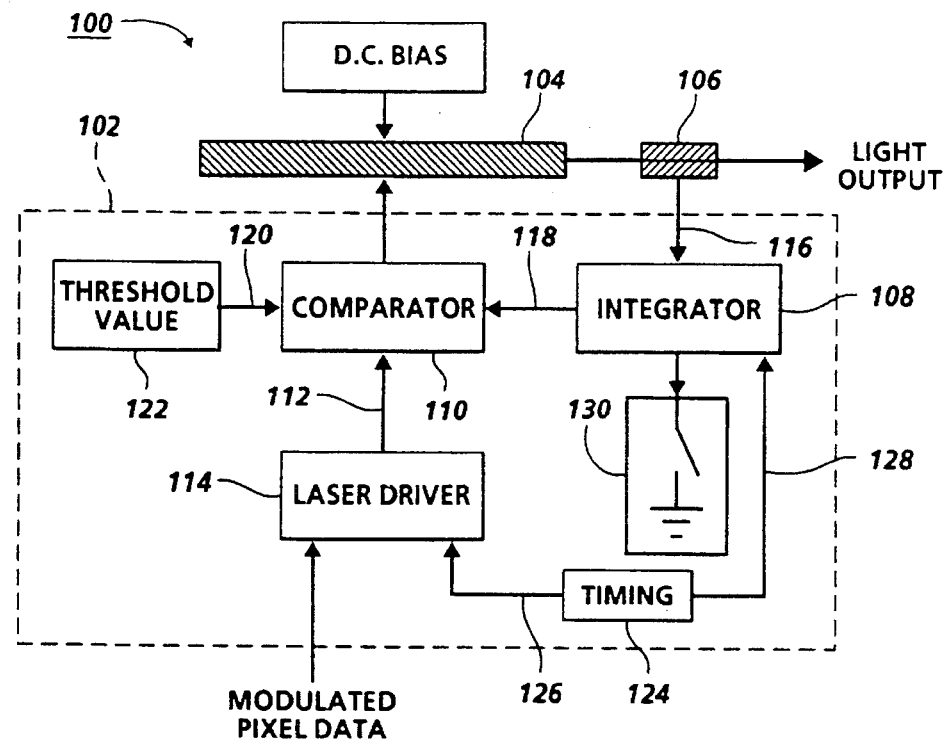
FIG. 6 shows a functional diagram of one embodiment of the electrical apparatus used to control the energy content of a single optical pulse emitted by the laser for the purposes of the present invention.

FIG. 6 is a schematic illustration detailing a first embodiment of an apparatus for controlling the modulation of a light source in an optical output system 100. In FIG. 6, apparatus 102 is employed in conjunction with a light source such as laser 104 and a photodetector 106. Apparatus 102 includes an integrator circuit 108 and a comparator circuit 110. A laser drive signal 112 from laser driver 114, which represents the modulated pixel data to be written onto the photoreceptive medium, is input to the comparator 110. Integrator circuit 108 receives the output photocurrent 116 from detector 106 and produces as its output signal 118 the time-integrated value of the photocurrent. Photocurrent 116, which is an electrical signal representative of the time-varying amplitude of the output light beam from laser 104, is integrated over time by integrator circuit 108 by any one of a large number of methods well known to those skilled in the art. The output signal of the integrator is proportional to the total energy E(t) emitted by the laser 104 from the beginning of the pulse up to time t, i.e., $$E(t) = K \int_0^t P(t')dt',$$

where P(t') is the power emitted by the laser at time t' and K is a proportionality constant. The output signal 118 is input to comparator circuit 110.

A threshold value 120 is additionally input to comparator circuit 110 from threshold value circuit 122. The threshold value may be chosen when the system is initially set up to be the voltage level at which the integrator output signal represents the optical energy value for optimally forming the desired spot on the photoreceptive medium. Thus, the threshold value can be selected to take into account variations in the laser output power, manufacturing variations in the photoreceptor sensitivity, optical collection efficiency, etc.

The comparator circuit 110 operates in such a manner that when the voltage of the integrator output signal 118 is less than the threshold value 120 the laser drive signal 112 is permitted to drive laser 104, but when the voltage of the integrator signal 118 is equal to or exceeds the threshold value 120 the laser pulsed drive signal 112 is switched off from laser 104, thus limiting the energy forming the spot on the photoreceptive medium. Apparatus 102 of FIG. 6 may thus, in conjunction with laser source 104 and detector 106, control the duration of the optical pulse emitted by the laser source 104, and thus control for example the size of the spot formed on the photosensitive medium.

Timing circuit 124 produces timing signals 126 and 128 which are input to integrator 108 and laser driver 114. The timing signal sequences the laser driver 114 such that the integrator 108 may be reset by reset circuit 130, for example by shorting the integrator to ground, without interfering with the comparison done by comparator circuit 110.

Figure 6A:
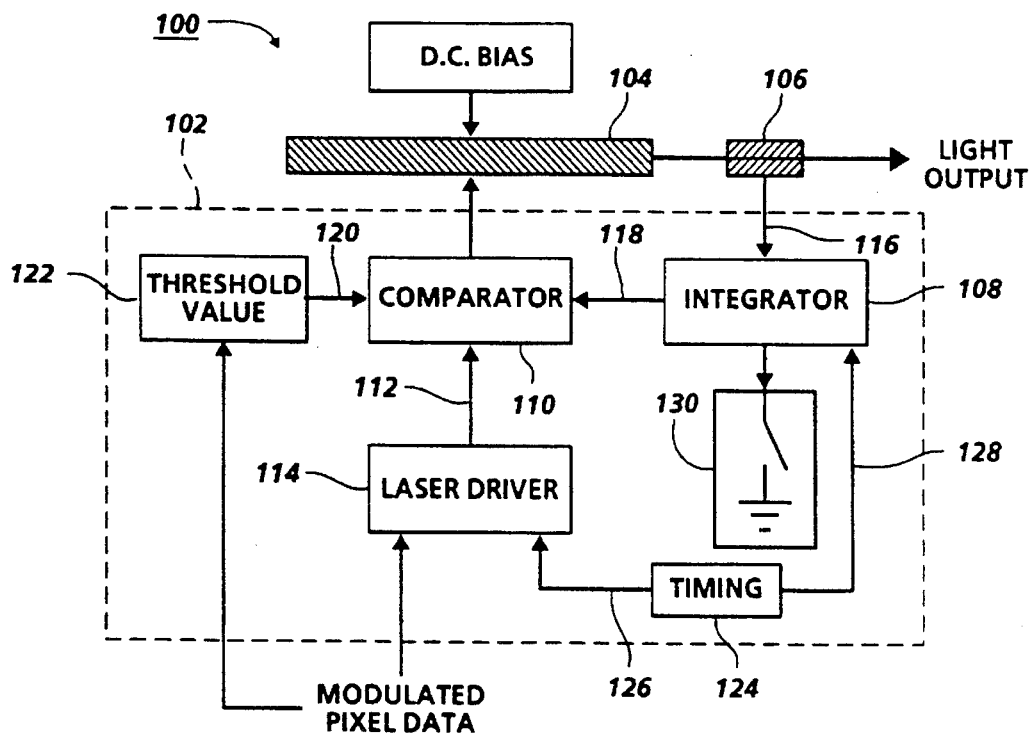
FIG. 6A shows a functional diagram of a second embodiment of the electrical apparatus used to control the energy content of a single optical pulse emitted by the laser for the purposes of the present invention.

FIG. 6A shows a variation of the embodiment of FIG. 6 in which the threshold value circuit 122 is connected so as to operate in coordination with the modulated pixel data, for example when more than one spot size is employed. In this embodiment, not only does the pixel data control the laser driver circuit 114, the pixel data also is employed to select from among the various threshold values in threshold value circuit 122. When a number of different spot sizes are required, the determination of the threshold value for the corresponding spot size is repeated for each required size. The threshold values may typically be stored in a look-up table with corresponding spot sizes so that when a particular spot size is required the appropriate threshold value may be quickly determined. Alternatively, an empirical relationship may be established between threshold value and spot size such that when a specific spot size is required, the threshold value required to obtain it may be determined.

Figure 7:
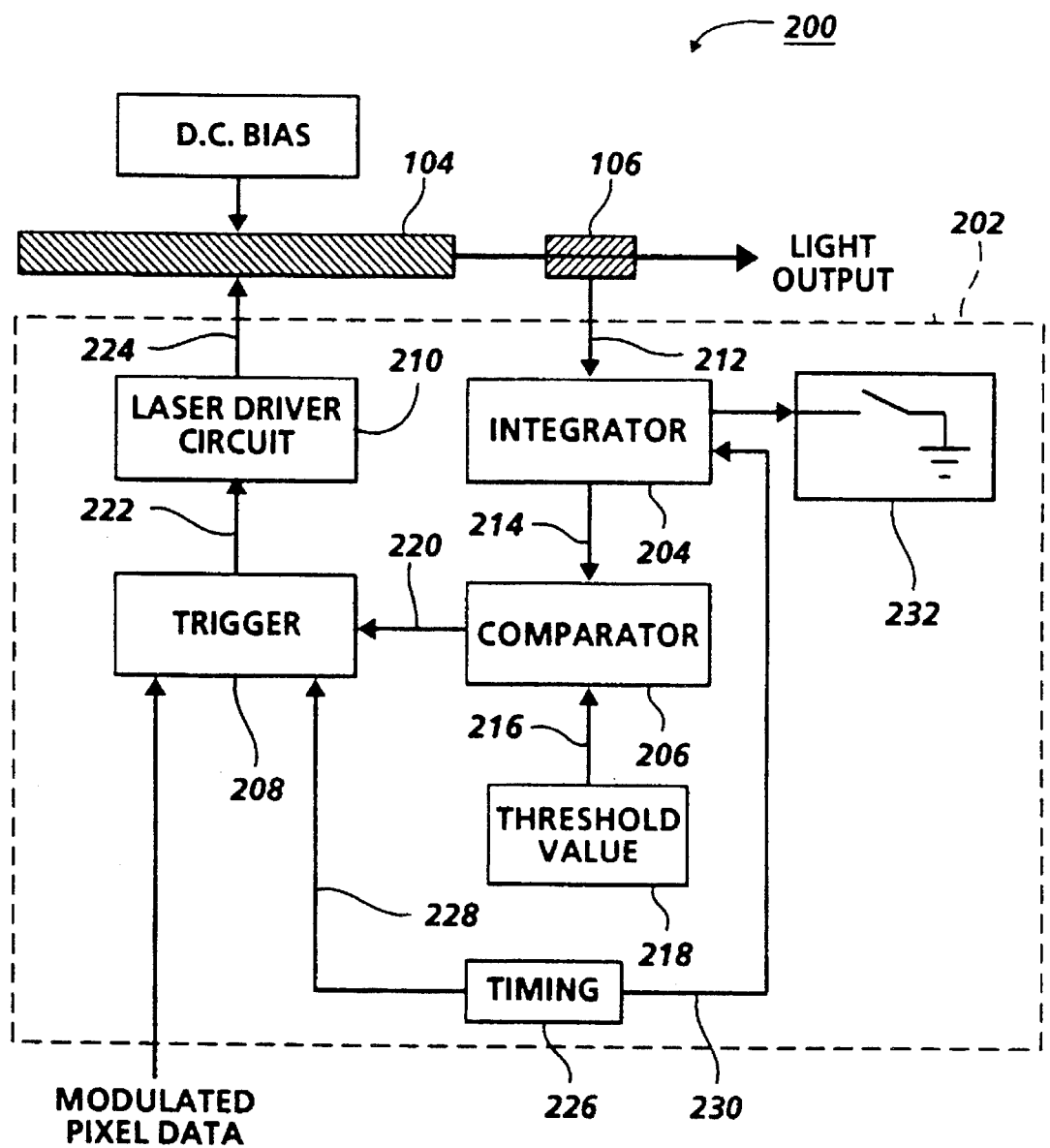
FIG. 7 shows a functional diagram of a third embodiment of the electrical apparatus used to control the energy content of a single optical pulse emitted by the laser for the purposes of the present invention.

According to another embodiment 200 of the present invention, shown in FIG. 7, control of the modulation of the light source is performed by operating the laser in conjunction with an electrical apparatus 202 consisting of an integrator circuit 204, a comparator circuit 206, a trigger circuit 208, and the laser drive circuit 210. Again, the integration circuit 204 produces an electrical output signal, which is the time integral of the photocurrent 212 from detector 106, by methods known in the art. In this embodiment, the integral valued electrical output signal 214 from integrator 204 is input to the comparator circuit 206, which compares the output signal 214 to a threshold value 216 from threshold value circuit 218. Comparator circuit 206 produces an electrical output signal of a first value when the electrical output signal 214 is less than the threshold value 216, and an electrical output of a second value is produced otherwise. The electrical output signal 220 from comparator circuit 206 is input to the trigger circuit 208, which switches the level of its own electrical output signal 222, e.g. from a low value to a high value, in response to the first value of the electrical input signal 220, and switches the level of its electrical output signal 222 oppositely, e.g. from high to low, in response to the second value of the electrical input signal 220. The output signal 222 from trigger circuit 208 is input to laser drive circuit 210, which provides laser drive current 224 to the diode laser 104 as a function of the level of the electrical input signal 222, e.g., a first input signal value causes the drive circuit 210 to supply drive current 224 at a level which is below the laser threshold, while a second input signal level causes the drive circuit 210 to supply drive current 224 at a level which is at the desired operating power of the laser.

When the value of the integrator output signal 214 is less than the threshold value 216, the laser drive signal 224 is permitted to drive laser 104 at the desired operating power, but when the value of the integrator output signal 214 is equal to or exceeds the threshold value 216 the laser drive signal 224 is reduced below the laser threshold value, thus limiting the energy forming the spot on the photoreceptive medium. Apparatus 202 of FIG. 7 may thus, in conjunction with laser source 104 and detector 106, control the duration of the optical pulse emitted by the laser source 104, and thus control for example the size of the spot formed on the photosensitive medium.

Timing circuit 226 produces timing signals 228 and 230 which are input to integrator circuit 204 and trigger circuit 208. The timing signal sequences the trigger circuit 208 such that the integrator 204 may be reset by reset circuit 232, for example by shorting the integrator circuit 204 to ground, without interfering with the comparison done by comparator circuit 206.

Figure 8A:
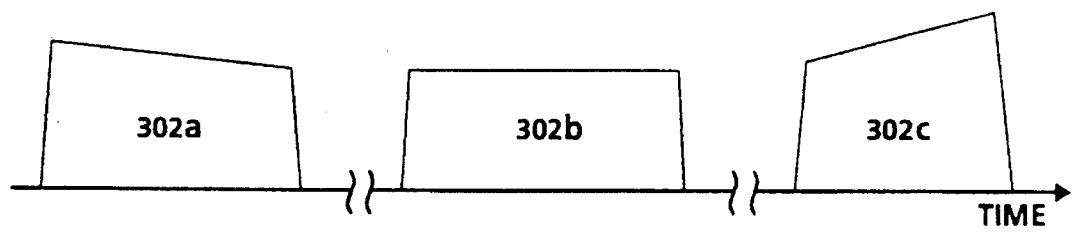
FIGS. 8A–8D shows typical waveforms at different points in the functional diagram of FIG. 7.
Figure 8B:
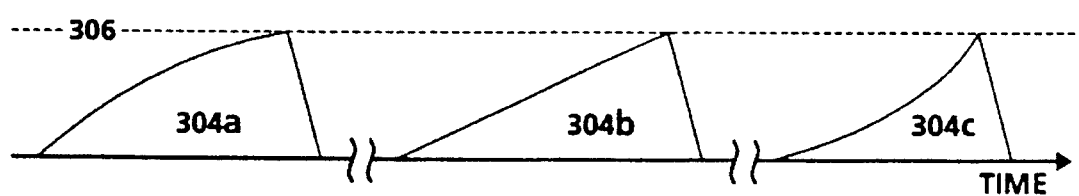
Figure 8C:
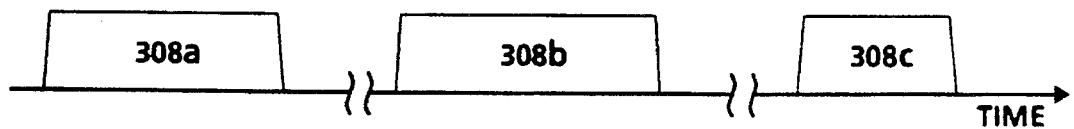
Figure 8D:
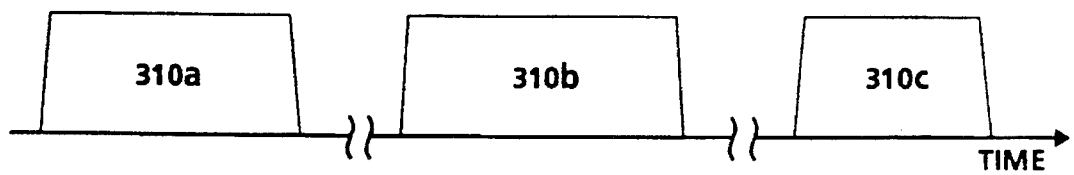

FIGS. 8a through 8d shows waveforms of the output signals at different points in apparatus 202 of FIG. 7. FIG. 8a shows the photocurrent 212 from the photodetector 90, and is an electrical representation of the optical output of the laser 78 for three types of time-varying pulses. Pulse 302a illustrates a first type of pulse wherein the amplitude is decreasing during the pulse (positive droop). Pulse 302b illustrates a second type of pulse wherein the amplitude is constant during the pulse (no droop). Pulse 302c illustrates a third type of pulse wherein the amplitude is increasing during the pulse (negative droop). FIG. 8b shows the integrated detector output corresponding to each of the types of pulses shown in FIG. 8a, where the shape of the pulse depends on the nature of the corresponding photocurrent 212, i.e. superlinear increase in pulse 304a, linear increase in pulse 304b, and sublinear increase in pulse 304c. The waveforms shown in FIG. 8c are the trigger signals generated when the modulated pixel data initiates a new current pulse which lasts until waveform 304a, 304b, 304c reaches the threshold value 306. The waveforms shown in FIG. 8c represent the output of the trigger circuit 208 corresponding to each of the waveforms in FIGS. 8a and 8b. The waveforms shown in FIG. 8d are the amplitude of the laser drive current 224, where the start of each waveform is initiated by the switch of the trigger output signal 222 from low to high followed by termination when the trigger output signal 222 switches from high to low.

The threshold signal 216 which is input to the comparator determines the amount of energy to be delivered to the photoreceptor in a pulse and is set by the information data to be printed. Since the amount of energy in a pulse determines the exposure level of the image, e.g. the areal size of the exposure on a xerographic photoreceptor, holding the threshold value constant from pulse to pulse accurately maintains a fixed exposure condition during the scan in the presence of time variations in the laser's output intensity that arise from fluctuations in the laser's temperature or other variables affecting the laser's output intensity. Alternatively, the energy content of each pulse and consequently the exposure level in the case of a xerographic image can be accurately varied by changing the threshold value from pulse to pulse despite variations in the laser output that might arise from temperature fluctuations, varying drive current pulse width, etc. Such variation of the exposure level of the photoreceptor may be useful to compensate for decreasing sensitivity of the photoreceptor resulting from prolonged use, or to create desired output effects.

The electrical apparatus 102 or 202 can be a separate electrical component used in conjunction with a single laser source or a monolithic array of laser emitters. For example, it may be constructed as a silicon or GaAs integrated circuit connected to the laser as is well known in the art. In the case that optical source 14 is a single laser, detector 90 can be an integral part of the integrated circuit. In the case that optical source 14 (FIG. 1) is an array of closely spaced lasers, a preferred embodiment is to integrate the detector and the laser into a monolithic apparatus as disclosed in the aforementioned application Ser. Nos. 07/500,814 and 07/714,287. Apparatus 102 or 202 may alternatively be monolithically integrated with either a single laser source or a monolithic array of lasers.

It will be apparent that, depending on the operating parameters of the optical output apparatus embodying the present invention, optical energy control may be achieved on a spot-by-spot basis. For example, consider a relatively high performance laser xerographic printing apparatus with typical operating parameters of 60 page per minute output, 600×600 spot per inch resolution, and 14 inch scan. For this device, a typical spot exposure time is on the order of 14 nanoseconds. Proper selection and design of electrical circuits and interconnections for the electrical apparatus of the present invention will allow switching speeds of 1 nanosecond or faster, thus facilitating spot-to-spot control of the optical energy.

Figure 9:
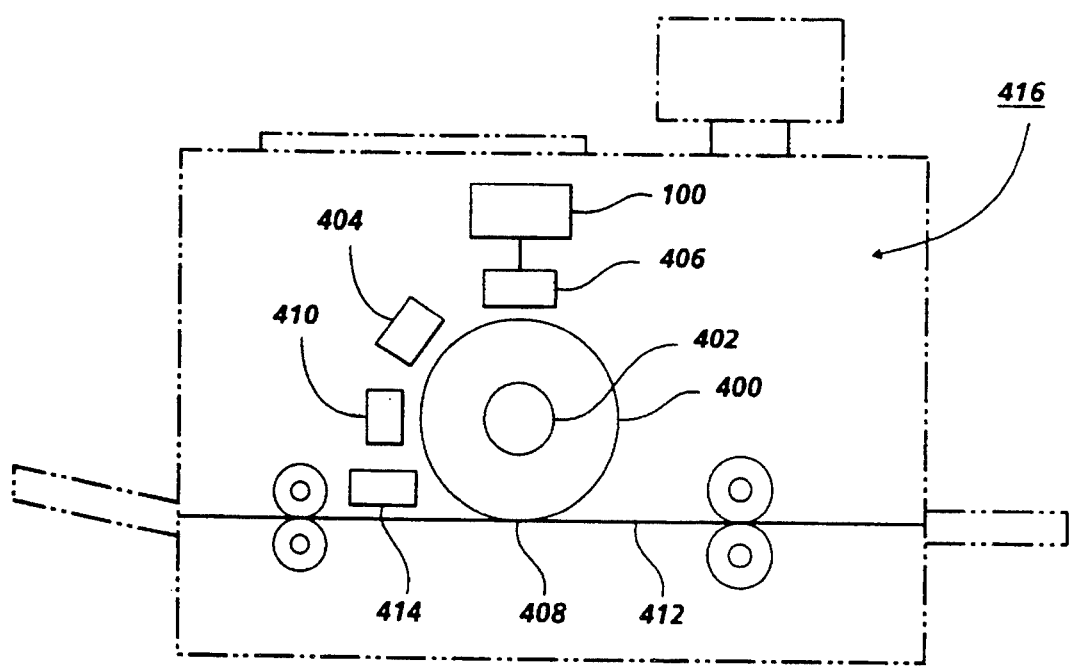
FIG. 9 shows a schematic diagram for a complete xerographic print engine employing the exposure control method and apparatus of the present invention.

With reference to FIG. 9, by incorporating the above described exposure control methodology with the appropriate apparatus for xerographic printing, including, for example, a photoreceptor belt or drum 400, means for moving the photoreceptor 402, means for charging the photoreceptor 404, means for forming a latent image on the photoreceptor 406, means for transferring the latent image to paper 408, means for erasing the latent image from the photoreceptor and for cleaning the photoreceptor 41 0, paper transport means 412, and means for fusing the image onto the paper 414, a complete xerographic print engine 416 may be produced. Details of the structure and operation of printer devices in general are beyond the scope of the present disclosure, however they are well known to those skilled in the art. It will be appreciated from the above description, though, that the present invention is particularly well suited for inclusion in those printing applications employing ROS as a portion of the printing process, as well as other printing applications.

In general, to those skilled in the art to which this invention relates, many changes in construction and widely differing embodiments and applications of the present invention will suggest themselves without departing from its spirit and scope. For example, the present invention operates equally well, and without significant modification, to control exposure in a single beam ROS or in a multiple beam ROS. Furthermore, the apparatus and method of the present invention may be combined with other apparatus and/or methods of modulating the output beam of a diode laser to achieve advantageous results. For example, the inventions of application Ser. Nos. 07/634,989 and 07/841,399, which are incorporated by reference herein, may be employed herewith such that the content of all pulses emitted from a multiple laser array are accurately controlled. Thus, the disclosures and descriptions herein are illustrative, and are not intended to be in any sense limiting.

What is claimed is:

1. A method for dynamic control of individual spot exposure in an optical output device having a light source, means for driving the light source in accordance with a pulsed data signal so as to produce light source output comprised of individual light pulses, means for terminating the light source output independently of the data signal, a photodetector for converting at least a portion of each of said individual light pulses into a photocurrent pulse, an integrator for determining the measure of energy in each of said light pulses, a threshold memory, and a comparator for comparing the measure of energy in each of said light pulses and the contents of the threshold memory, comprising the steps of:

driving the light source in accordance with the pulsed data signal so as to cause the light source to emit light;

detecting at least a portion of the light emitted by the light source, wherein the detected portion of the emitted light is comprised of individual light pulses;

converting each of said detected light pulses into a photocurrent pulse;

producing the time-integral of a full length of the photocurrent pulse;

comparing the time-integral of the full length of the photocurrent pulse to the contents of the threshold memory; and terminating the light source output independently of the data signal when the time-integral of the full length of the photocurrent pulse becomes equal to or greater than the value of the contents of the threshold memory.

2. The method of claim 1, wherein the light source is a solid state laser, the means for driving the light source includes a switchable current supply that causes the current applied to the laser to vary from a current below to a current above the threshold value of the laser in response to a data signal, and the means for terminating the light source output independently of the data signal causes the current supplied to the laser by the current supply to drop below the threshold value for the laser independently of the data signal.

3. The method of claim 1, wherein the optical output device further includes a timing apparatus and wherein the method further comprises the step of synchronizing the light source and the means for terminating the light source output independently of the data signal such that terminating the light source output independently of the data signal for one spot does not affect the driving of the light source in accordance with the data signal for any other spot.

4. The method of claim 1, wherein the device further consists of a photoreceptive medium upon which a spot is formed, the contents of the threshold memory includes at least the value of the time-integrated photocurrent required to produce a desired spot exposure on the photoreceptive medium, and further comprising the step of selecting the contents of the threshold memory for comparison with the time-integrated photocurrent.

5. The method of claim 4, wherein the threshold memory contains multiple values, each value corresponding to a different spot exposure, each spot to be formed on the photoreceptor being assigned one of the values in the threshold memory, and the assigned value for each spot being communicated to the threshold memory prior to comparison of the selected threshold value with the time-integrated photocurrent.

6. In a method for obtaining a desired spot exposure on a photoreceptive medium from an optical output device including a laser light source, current supply means supplying current to the laser for driving the laser in accordance with a pulsed data signal switchable from below to above a laser threshold value so as to produce the light source output comprised of individual light pulses, switching means for terminating the laser current independently of the data signal, a photodetector for converting at least a portion of each of said individual light pulses into a photocurrent pulse, an integrator for determining the time-integral value of a full length of the photocurrent pulse, a threshold memory having a threshold memory value stored therein, a comparator for comparing the time-integral of the full length of the photocurrent pulse and the threshold memory value in the threshold memory, and a photoreceptive medium, the improvement comprising the steps of:

determining the time-integral value of a photocurrent pulse to produce the desired spot exposure on the photoreceptive medium;

setting the threshold memory value stored in the threshold memory to said time-integral value of a photocurrent pulse determined to produce the desired spot exposure on the photoreceptive medium in said determining step; and causing the current supplied to the laser to switch from above to below the laser threshold value independently of the data signal when the time-integral value of a full length of the photocurrent pulse becomes equal to or greater than the threshold memory value stored in the threshold memory, as set in said setting step.

7. An apparatus for dynamically controlling the exposure of individual spots in an optical output device, comprising:

a light source;

means for driving the light source in accordance with a pulsed data signal so as to cause the light source to emit output in the form of light pulses;

means for terminating the light source output independently of the data signal;

a photodetector for detecting at least a portion of the light emitted by the light source wherein the detected portion of the emitted light is comprised of individual light pulses, and for converting each of said detected light pulses into a photocurrent pulse;

an integrator for determining the measure of energy in each of said detected light pulses by calculating the time-integral of a full length of the photocurrent pulse;

a threshold memory; and a comparator for comparing the time-integral of the full length of the photocurrent pulse and the contents of the threshold memory;

such that the means for terminating the light source output causes the light source to cease emitting light pulses when the time-integral of the full length of the photocurrent pulse becomes equal to or greater than the value of the contents of the threshold memory.

8. The apparatus of claim 7, wherein the light source is a solid state laser, and the means for driving the light source is a current supply switchable to cause the current applied to the laser to vary from a value below to a value above the threshold value of the laser, and the means for terminating the light source output causes the light source to cease emitting light by switching the current supplied to the laser by the means for driving the light source from above to below the threshold value of the laser.

9. The apparatus of claim 7, wherein the optical output device further includes a timing apparatus synchronized with the means for terminating the light source output so that causing the light source to cease emitting light for one spot does not affect the driving of the light source in accordance with the data signal for any other spot.

10. An improved printing apparatus including a light source, means for driving the light source in accordance with a pulsed data signal so as to cause the light source to emit light pulses, photoreceptor, means for moving the photoreceptor, means for charging the photoreceptor, means for forming a latent image on the photoreceptor, means for transferring the latent image to paper, means for erasing the latent image from the photoreceptor and for cleaning the photoreceptor, paper transport means, and means for fusing the image onto the paper, the improvement comprising:

a photodetector for detecting at least a portion of the light emitted by the light source wherein the detected portion of the emitted light is comprised of individual light pulses, and for converting each of said detected light pulses into a photocurrent pulse;

an integrator for determining the measure of energy in each of said detected light pulses by calculating the time-integral of a full length of the photocurrent pulse;

a threshold memory;

a switching means for terminating the laser current independently of the data signal, and a comparator for comparing the time-integral of the full length of the photocurrent pulse and the contents of the threshold memory;

such that the switching means causes the light source to cease emitting light pulses when the time-integral of the full length of the photocurrent pulse becomes equal to or greater than the value of the contents of the threshold memory.

* * * * *